United States Patent [19]
Wright

[11] Patent Number: 5,838,734
[45] Date of Patent: Nov. 17, 1998

[54] COMPENSATION FOR LOCAL OSCILLATOR ERRORS IN AN OFDM RECEIVER

[75] Inventor: Derek Thomas Wright, London, United Kingdom

[73] Assignee: British Broadcasting Corporation, London, United Kingdom

[21] Appl. No.: 549,831

[22] PCT Filed: May 5, 1994

[86] PCT No.: PCT/GB94/00962

§ 371 Date: Mar. 26, 1996

§ 102(e) Date: Mar. 26, 1996

[87] PCT Pub. No.: WO94/26046

PCT Pub. Date: Nov. 10, 1994

[30] Foreign Application Priority Data

May 5, 1993 [GB] United Kingdom .................... 9309212

[51] Int. Cl.[6] .................................................. H04L 27/06
[52] U.S. Cl. .......................... 376/316; 375/326; 375/341; 375/340
[58] Field of Search .................................... 375/260, 341, 375/340, 262, 200, 316, 346, 326; 370/208, 206; 348/725

[56] References Cited

U.S. PATENT DOCUMENTS

| | | | |
|---|---|---|---|
| 4,881,241 | 11/1989 | Pommier et al. ........................ | 375/260 |
| 5,282,222 | 1/1994 | Fattouche et al. ....................... | 375/200 |
| 5,369,670 | 11/1994 | Zagloul et al. .......................... | 375/340 |
| 5,452,288 | 9/1995 | Rahuel et al. ........................... | 375/260 |

FOREIGN PATENT DOCUMENTS

| | | |
|---|---|---|
| 0208872 A1 | 1/1987 | European Pat. Off. . |
| 0 407 673 A1 | 1/1991 | European Pat. Off. . |
| 0499560 A1 | 8/1992 | European Pat. Off. . |
| 0 506 400 A2 | 9/1992 | European Pat. Off. . |
| WO 90/04893 | 5/1990 | WIPO . |
| WO 92/05646 | 4/1992 | WIPO . |

OTHER PUBLICATIONS

H. Nakamura, et al "Power Efficient High–Level Modulation for High–Capacity Digital Radio Systems", *The Transactions of the Institute of Electronics, Information and Comm. Engineers*, E72, 1989, No. 5, Toyko, Japan, pp. 633–639.

F. Daffara, et al "Maximum Likelihood Frequency Detectors for Orthogonal Multicarrier Systems", *IEEE International Conference on Communications*, '93, May 1993, Conference Record, vol. 2/3, pp. 766–771.

*Primary Examiner*—Tesfaldet Bocure
*Attorney, Agent, or Firm*—George W. Neuner

[57] ABSTRACT

A receiver for orthogonal frequency division multiplexed signals includes means (14) for calculating the (discrete) Fourier Transform of the received signal, and means (20) for calculating the phase error due to local oscillator errors.

9 Claims, 4 Drawing Sheets

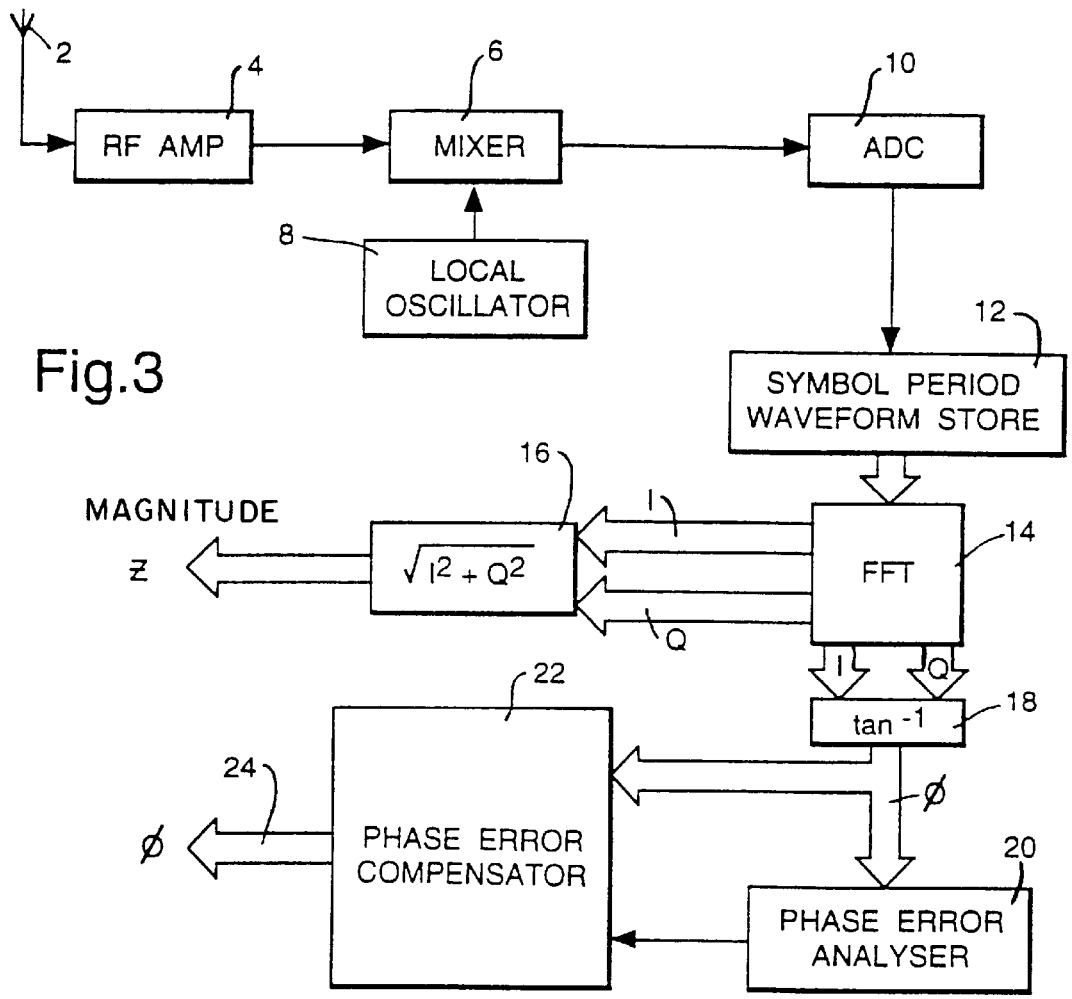
Fig.3
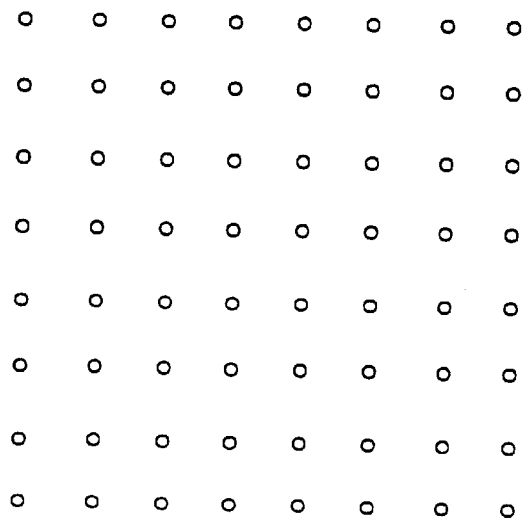
Fig.4 64 QAM

Fig.5
PHASE/MAGNIFICATION PATTERN FROM A SQUARE CONSTELLATION.
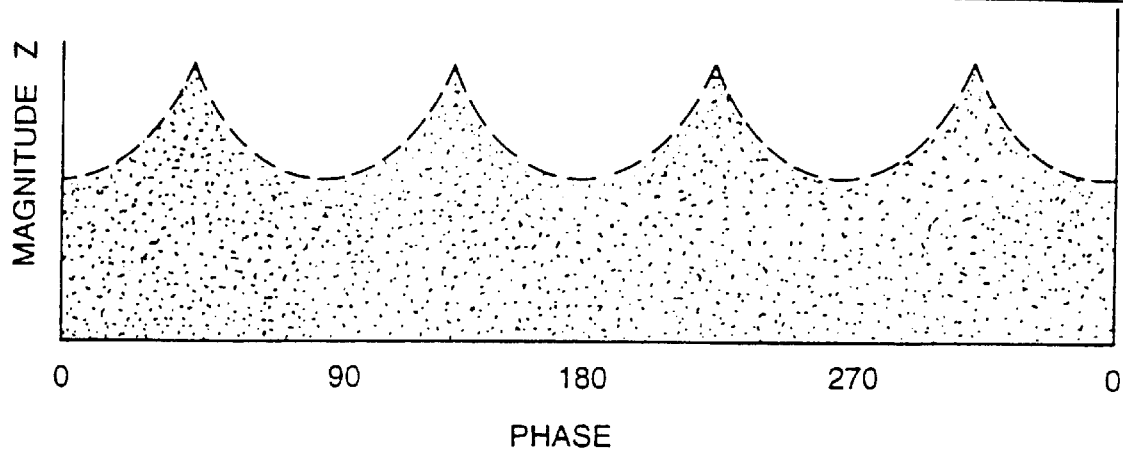
Fig.6  PART POPULATED 256 QAM
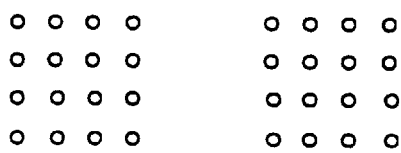
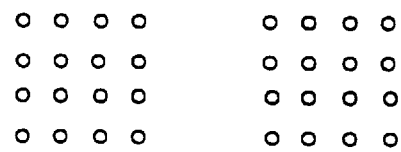

64 QAM WITH PIE - SLICE MODIFICATION BY NOT USING 10 uf THE 64 STATES.

64QAM WITH PIE - SLICE MODIFICATION

COMPENSATION FOR LOCAL OSCILLATOR ERRORS IN AN OFDM RECEIVER

FIELD OF THE INVENTION

This invention relates to receiving equipment for digital transmissions of the orthogonal frequency division multiplex type and in particular to receiving equipment which can compensate for phase errors in the received digital signals.

BACKGROUND OF THE INVENTION

Orthogonal frequency division multiplex (OFDM) is a modulation technique which has been proprosed by the Eureka 147 digital broadcasting consortium. In such transmissions digital data is divided between a large number of adjacent carriers so that a relatively small amount of data is. carried on each carrier. This is the frequency division multiplex part of OFDM. The orthogonal part of the OFDM name arises because adjacent carriers are arranged to be mathematically orthogonal so that their sidebands may overlap but signals can still be received without adjacent carrier interference.

Digital data is modulated onto a carrier using quadrature phase shift keying (QPSK) or a higher level of quadrature amplitude modulation (QAM) such a 64 QAM or 256 QAM. FIG. 1 shows a phase diagram for a QPSK modulation scheme. The scheme provides four phase states which are represented by vectors, one in each quadrant of the phase diagram. Thus with a QPSK scheme a two bit word can be modulated onto a carrier by varying the phase of the carrier.

FIG. 2 shows a 16 QAM modulation scheme which provides 16 phase states, for each quadrant. The four vectors in the upper right quadrant are indicated on the figure. This scheme enables four bit words to be modulated onto a carrier by varying the phase and amplitude of the carrier.

The QPSE modulation scheme of FIG. 1 has a tolerance of 45° to phase shift errors for the carrier. It will be appreciated that for the 16 QAM scheme of FIG. 2 this tolerance is reduced and for higher order QAM schemes e.g. 64 QAM, the phase shift error tolerance is reduced still further. Thus the minimization of phase shift errors in transmitter and receiver becomes important.

In a practical OFDM transmitter and receiver the need for modulators, filters, and demodulators for each carrier is avoided by use of the fast fourier transform (FFT) algorithmn to perform the modulation/de-modulation process on the many carriers. In order to transmit the many carriers the wide band frequency domain digital signal is transformed using an FFT into the time domain. This signal is then transmitted. In a receiver the reverse process is applied to produce the plurality of carriers. The FFT for a sample of the signal is known as a symbol and this is what is transmitted and then received.

There are various sources of phase noise in the transmission and reception of the signal and some of these are discussed below.

Phase errors due to thermally generated random noise affect the amplitudes and phases of the carriers in a way such that there is no relationship between the errors of different carriers in the same FFT frame or between the errors on a chosen carrier between different FFT frames.

Phase errors due to local oscillator phase noise in a receiver appear equally on all carriers within one FFT frame, but the value of this error is random in terms of its value for any or all carriers between one FFT frame and the next. The amplitudes of the carriers will not be affected by local oscillator phase noise.

A frequency error on the local oscillator can be interpreted as a phase error which is equal an all carriers in any one FFT frame and where the angle of such error progresses systematically from frame to frame at a rate dependent on the frequency error. It can be detected by detecting the phase error on any chosen carrier in every frame and calculating the average of the rate of progression. Using the average sill eliminate the effects of random noise.

An error in the timing of the FFT frame is equivalent to a uniform group delay error across the frequency band occupied by the carriers. Each carrier has a phase error which is directly related to its frequency and the delay value. The advance (or retard). of phase with carrier frequency error is continuous but would typically be interpreted during measurement as a sawtooth excursing between angles of $-\pi/2$ and $+\pi/2$. If the FFT frame timing error is consistent these errors will be consistent for each carrier from frame to frame and each would be removed by differential phase decoding. Without differential phase decoding a consistent timing error can be deduced by comparing the difference in the average phase error between two reference carriers near to each end of the band; the evaluation of the timing error will be simpler if these two reference carriers do not carry phase modulation.

There will inevitably be a small element of random jitter in the timing of the FFT frame causing phase errors which increase (positively or negatively) in direct relation to the carrier changes from frame to frame. If this effect is present it will cause significant errors only on the higher frequency carriers. The magnitude of the effect can be kept acceptably small by providing adequate flywheeling on the timing arrangements for the FFT window.

We have appreciated that although the phase error due to the local oscillator is equal on all carriers the value for each carrier will be masked by the modulation and random noise. Averaging between FFT time frames is not appropriate and the use of sufficient unmodulated carriers within a single frame to average out the effects of the random noise would cuase unacceptable loss of data capacity. A more thorough phase noise analysis has to be made to remove phase noise from the carriers.

When considering the likely problems to OFDM systems caused by phase noise in the local oscillator, it is necessary to consider two aspects. On the one hand we need to know how much phase noise can be expected from different configurations of local oscillator. On the other hand we need to know how much phase noise can be tolerated by the modulation system.

As a starting point the considerations applied to Digital Audio Broadcast systems can be re-evaluated to digital television transmission. The following differences will need to be taken in account.

1. The frequency at which the oscillator operates.

For a given oscillator design, we might expect the phase noise to increase with the frequency of operation.

2. The tuning range.

A large tuning range makes the oscillator more susceptible to the noise generated by the varicap diode which is used as the controlling element. This suggests the need for an oscillator with a limited locking range and discrete frequency steps between these ranges.

3. The carrier spacing of the modulation system.

We can anticipate a typical spectrum of noise sidebands for a local oscillator which rises at frequencies closer to the centre frequency. We can also expect all the carriers in the OFDM ensemble to acquire the same side band information in the mixing process, since each carrier will independently mix with the local oscillator in a similar way. All carriers should, therefore, suffer identical phase perturbation.

The integrate and dump nature of the FFT process in OFDM demodulation is such that frequency components of phase noise above 100% of the symbol rate or below about 10% of the symbol rate become less relevant. The rising noise sideband level at lower frequencies therefore make the dominant effect that due to the sidebands at frequencies equal to about one tenth of the carrier spacing. At small values of carrier spacing there is a rapid increase in the effects of phase noise.

4. The euclidian distance of the modulation system.

In terms of added noise voltage, a change from QPSK to 16 QAM or 64QAM leads respectively to approximately 6 dB and 12 dB reductions in noise immunity. For phase errors only, the 90° separation between QPSK points allows phase noise to perturb the true phase by up to 45° before errors occur. In 16 QAM systems this figure becomes respectively 18.44° and 8.113° for the points at the extremities of 16 QAM and 64 QAM constellations (closest to the axes, not the diagonal corners). Compared with the factors of 2 and 4 reduction in permissable voltage added noise, the reduction factors for phase added noise are 2.44 (7.75 dB) and 5.53 (14.86 dB) respectively.

SUMMARY OF THE INVENTION

We have thus appreciated that local oscillator phase noise is a serious problem when transmitting higher data rates on an OFDM system, for example data rates of the order which would be required to transmit a digital television signal in a conventional UHF television channel. Furthermore we have appreciated that a simple averaging of phase noise between FFT time frames is not appropriate to removal of the local oscillator noise.

We therefore propose a system in which the phase errors in a received signal are analysed at a receiver and corrected phase values derived.

BRIEF DESCRIPTION OF THE DRAWINGS

A block diagram of a proprosed receiver which includes this phase error analysis is shown in FIG. 3. In this the FFT of an OFDM signal is received by an antenna 2 and a radio frequency amplifier 4. The receiver signal is combined, in a mixer 6, with a frequency signal from a local oscillator 8. The combined signals then pass to an analogue to digital converter 10 which outputs a digital signal corresponding to a received FFT symbol. This is stored in a symbol period wave form store 12. Each stored symbol period is then fed, in turn, to an FFT block 14 which converts it to the frequency domain.

The FFT block 14 has outputs for the I and Q values of each of the carriers which were originally encoded at the transmitter. These pass to a converter 16 which derives the magnitude Z for each vector from the QAM diagram which they represent. These I and Q values also pass to the converter 18 which derives an angle for each vector in the QAM phase diagram and supplies this to a phase error analyser 20 as well as to a phase error compensator 22. The phase error analyser 20 removes phase noise due to the local oscillator 8 and the phase angles are then corrected in the phase error compensator to provide a corrected output 24.

Figure 1:
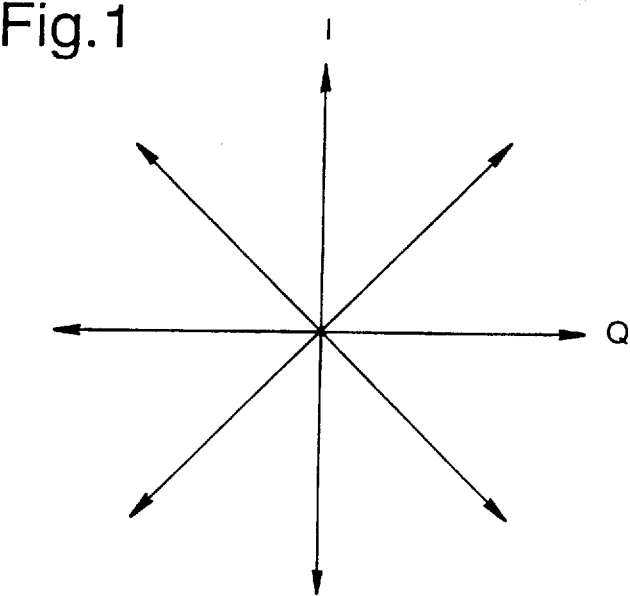
Figure 2:
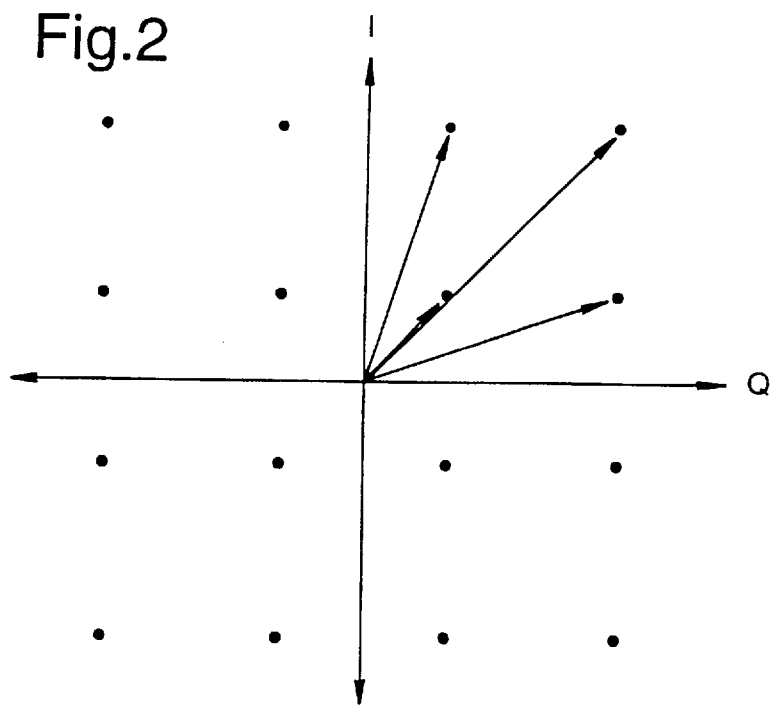

Thus the system of FIG. 3 provides a receiver which is able to analyse and compensate for phase noise generated by the local oscillator and thus avoids the need for a more accurate (e.g. crystal) local oscillator thereby minimising the cost of receiving equipment.

Using such an arrangement should enable digital transmissions to be used for television signals such as IMTV signals in conventional television channels.

All the proposed techniques which could be used to discover the common value of phase error on all carriers due to the local oscillator, are based upon maximum likelihood decoding and/or majority logic decisions across all the carriers in (or possibly large groups of carriers from) the ensemble.

The first possibility is one based upon maximum likelihood techniques. This assumes one of a number of possibilities about the phase state of each carrier due to the modulation. For example, it could be assumed that the modulation might correspond to the modulation phase state nearest to the actual detected phase, or the nearest one or more states on either side. It should be noted that, in general, we would not expect thermal noise to have moved the modulation state from the original phase by more than the phase interval between the assumed state and the adjacent ones on either side; if this requirement were not met there would necessarily be a high bit-error rate due to random noise generated in channel, without consideration of any additional effects due to the local oscillator phase error.

We could then use majority voting and maximum likelihood decoding techniques to find which combination of possible modulation scenarios gives the lowest standard deviation to the average of the residual phase errors across all carriers. In this respect the existence of a standard deviation would be due to thermal noise effects and the mean error should be due to the instantaneous phase state of the local oscillator for that FFT frame. It may be necessary for reasons of practicality to group the majority voting process to many groups of relatively few carriers each, in what is in effect a first round of removing what might be called the "modulation ambiguity" from the error analysis. Without grouping even trying only the nearest phase on either side of the measured values for all of 512 carriers would involve assessing $2^{512}$ combinations.

A possible simpler technique is to avoid taking the source modulation into account for each individual carrier by assuming that, for random modulating data, the means of the phase angles of all carriers in the FFT frame will statistically be close to zero. Note that the addition system needs to be defined carefully with regard to modulo arithmetic, otherwise the mean of all the carriers which have near zero phase and a small amount of random error will be 180° rather than the expected 0° (e.g. half around 5° and half around 355°).

There extends from the above the possibility of arranging the data at the transmission source such that the sum of all carrier phases in the modulation frame will exactly equal some chosen value. This might require some carriers to be dedicated to the purpose of allowing the sum to be adjusted. Alternatively there could be a means of transmitting the value of the sum or mean value in a supplementary data channel.

There is still some difficulty in using a method based upon average phase. This difficulty will be described by way of an analogy to a clock face.

On a clock face the average position of the hour hand over many randomly taken readings of the time will suggest that the average position is that which points toward the 30 minute marker. This is because all the readings are defined as lying between zero and 59 minutes. Consider now that the clock face has no numerals and is round. Furthermore, the whole clock has been rotated on the wall by some angle equivalent to say 't' minutes. This error would not be apparent since all time readings would still be categorised into a range between zero and 59 mintures since there was no way of knowing that they should have been taken in the range t to t+59. (In our analogy we disregard the clue given by relationship sys the hour hand position to the minute hand).

If the clock face was square, the rotation of the clock face on the wall would have been obvious, with no ambiguity until the error value was equivalent to greater than, ±45 of rotation (i.e. ±12 minutes). The point to note is that the constellation diagram for a 64 QAM modulation system (FIG. 4) has a square outline rather like a square clock face. Superimposing the vector points for all the carriers (say 512 minimum and 8192 maximum) in one FFT frame will give a result which is highly likely to contain several of each possible phase/magnitude state all with a common phase error. This will make the rotated clock face effect easily recognisable on an oscilloscope type of display, provided that the all carrier result is viewed separately for each frame (by using some storage technique associated with the display device).

The problem is to make a software estimation of the error angle in a sitation where all the individual vector points are displaced by random amounts due to the effects of thermal noise in the channel. The necessary averaging of the noise effects would intuitively be applied by a human observer viewing the oscilloscope display. The recognition factor is within the envelope of vector magnitude plotted vertically against the phase angle of the vector plotted horizontally, for the combined result of all carriers in the ensemble from a single received FFT frame (FIG. 5).

Without local oscillator phase errors a 16, 64 or 256 QAM system would have peaks in the all-carrier magnitude/phase envelope at 45°, 135°, 225° and 315°. A partially populated or 256 or 1024 QAM system (FIG. 6) which might be used for a hierarchical modulation system would produce an envelope which also had minima at 0°, 90°, 180°and 270°. A pattern recognition technique can be used to discover the actual positions of the peaks and minima and hence derive the error value.

Figure 7:
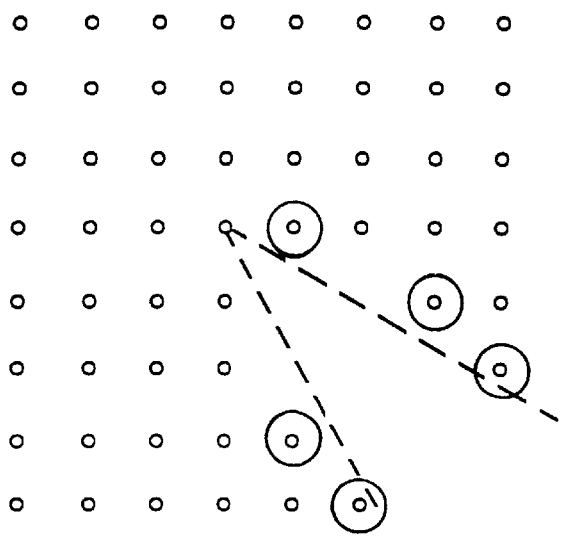
Figure 8:
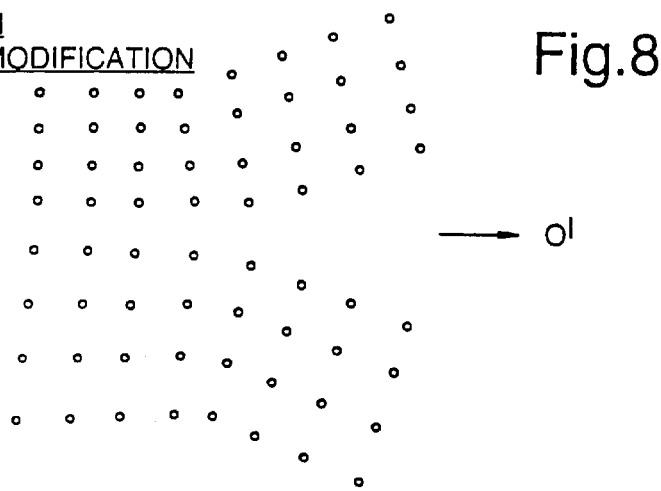
Figure 9:
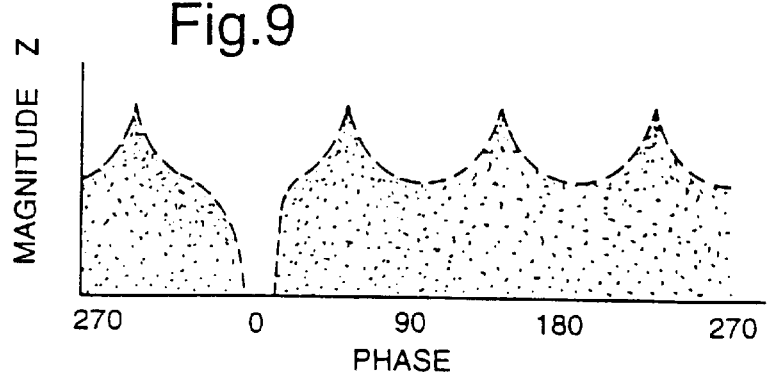

If greater than ±45° of phase error is expected the ambiguity free range can be increased up to ±180° by putting a unique feature into the constellation diagram. For example it could be deliberately arranged not to use any carriers within a particular 20° phase range and then to squeeze all the phases into the remaining 340°. This could be called a "sliced-pie modification" (FIG. 8) to the phase modulation system! An alternative to squeezing the phase states into the remaining space is to arrange the transmission so that the phase states corresponding to the pie-slice sector are never used (FIG. 7). The results in a magnitude phase distribution as shown in FIG. 9.

Rectangular, triangular and star-shaped outlines for constellation diagrams could also be contrived to provide particular levels of ambiguity range for detecting local oscillator phase errors in the way described above.

All of the foregoing assumes that the phase and frequency response variations between carriers are removed by standard equalisation procedures prior to attempting to evaluate the value of the local oscillator phase error from the combined effect of all carriers in a single phasor constellation diagram. These equalisation techniques are well established and typically make use of a training sequence transmitted from time to time in place of the data-carrying FFT symbol.

I claim:

1. A receiver for an orthogonal frequency division multiplexed signal comprising:

means for receiving a Fourier transform (FT) representation of the signal, inverse Fourier transform means for converting the FT to the frequency domain, means for deriving magnitude and phase of each frequency domain component of the inverse FT, means for analyzing the phase of the frequency domain component;

means for compensating for phase errors common to all carriers in one Fourier Transform symbol wherein the phase errors comprise phase noise from a local oscillator.

2. A receiver for an orthogonal frequency division multiplexed signal according to claim 1 in which the received signal comprises a television signal.

3. A receiver for an orthogonal frequency division multiplexed signal according to claim 1, in which the received signal comprises an FT of a quadrature amplitude modulation signal (QAM).

4. A receiver for an orthogonal frequency division multiplexed signal according to claim 1, in which the analyzing means operates by a maximum likelihood decoding technique.

5. A receiver for an orthogonal frequency division multiplexed signal according to claim 1, in which the analyzing means operates by a majority voting technique.

6. A receiver for an orthogonal frequency division multiplexed signal according to claim 1, in which the Fourier Transform is a Discrete Fourier Transform.

7. A receiver for an orthogonal frequency division multiplexed signal according to claim 1, in which the Fourier Transform is a Fast Fourier Transform.

8. A receiver for an orthogonal frequency division multiplexed signal comprising:

means for receiving a Fourier Transform (FT) representation of the signal:

inverse Fourier Transform means for converting the FT to the frequency domain;

means for deriving magnitude and phase of each frequency domain component of the inverse FT;

means for analyzing the phase of the frequency domain component by a maximum likelihood decoding technique; and means for compensating phase errors common to all carriers in one Fourier Transform symbol.

9. A receiver for an orthogonal frequency division multiplexed signal comprising:

means for receiving a Fourier Transform (FT) representation of the signal:

inverse Fourier Transform means for converting the FT to the frequency domain;

means for deriving magnitude and phase of each frequency domain component of the inverse FT;

means for analyzing the phase of the frequency domain component by a majority voting technique; and means for compensating for phase errors common to all carriers in one Fourier Transform symbol.

* * * * *